May 10, 1938.   H. W. ARNOLD ET AL   2,116,921
GLASS PRESS
Filed Aug. 26, 1935   4 Sheets-Sheet 1

Inventors
Henry W. Arnold
Charles Badger
Attorney

May 10, 1938.          H. W. ARNOLD ET AL          2,116,921
GLASS PRESS
Filed Aug. 26, 1935          4 Sheets-Sheet 2
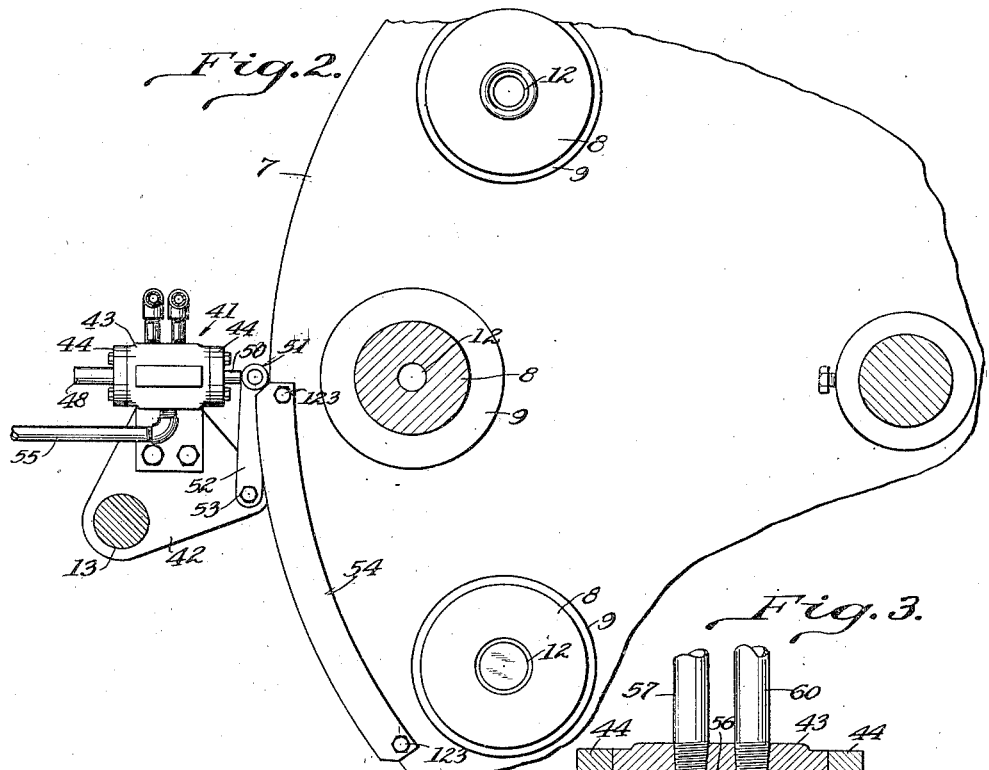
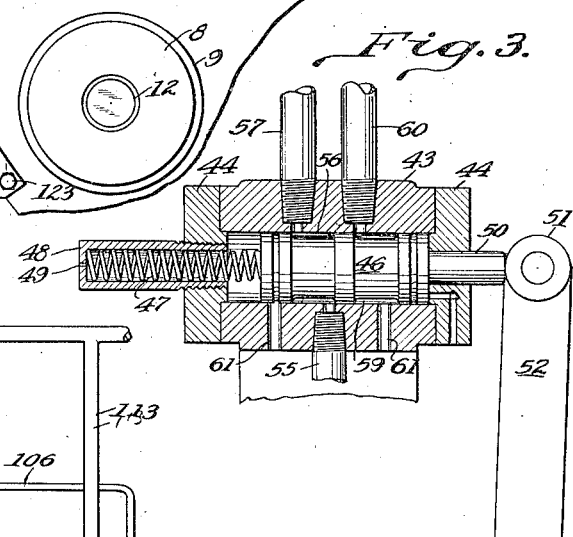
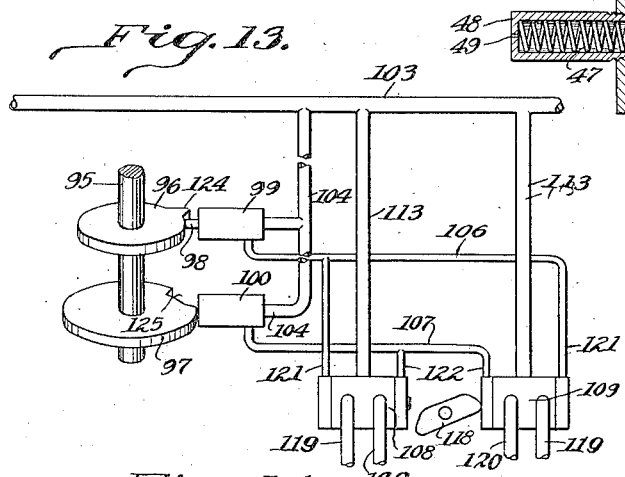
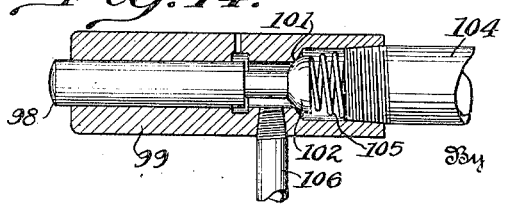
Inventors
Henry W. Arnold
Charles Badger
W. S. McDowell
Attorney May 10, 1938.  H. W. ARNOLD ET AL  2,116,921
GLASS PRESS
Filed Aug. 26, 1935     4 Sheets-Sheet 3
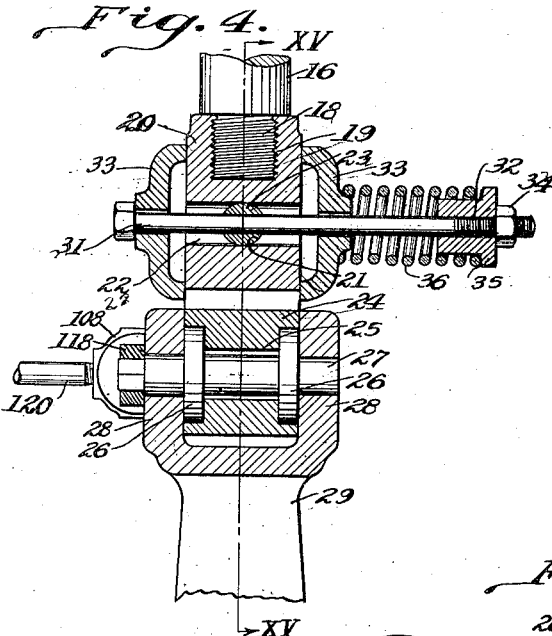
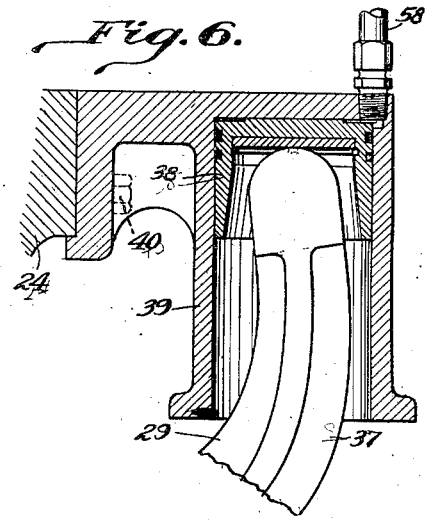
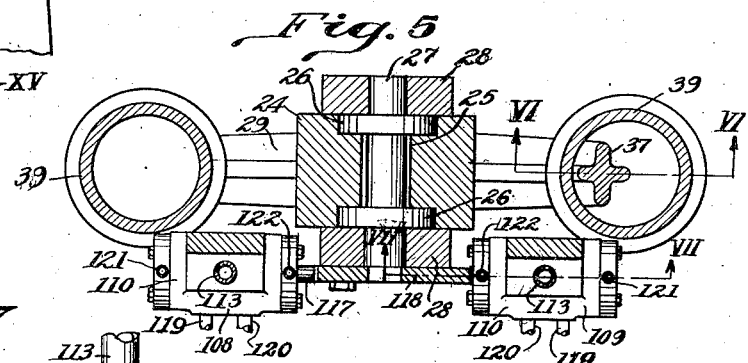
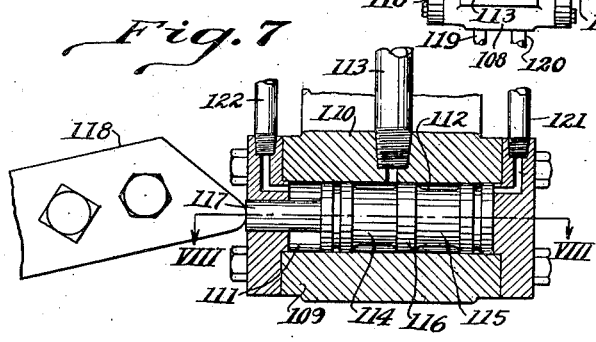
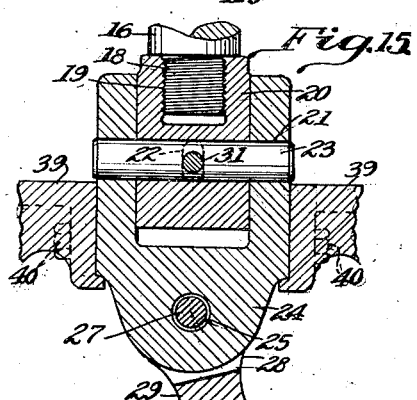
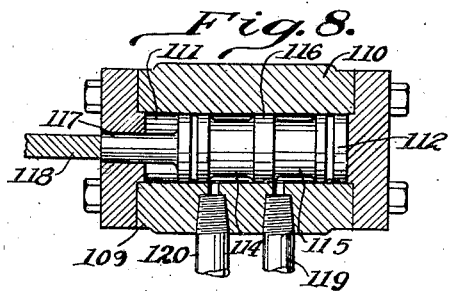
Inventors
Henry W. Arnold
Charles Badger
W. S. McDowell
Attorney

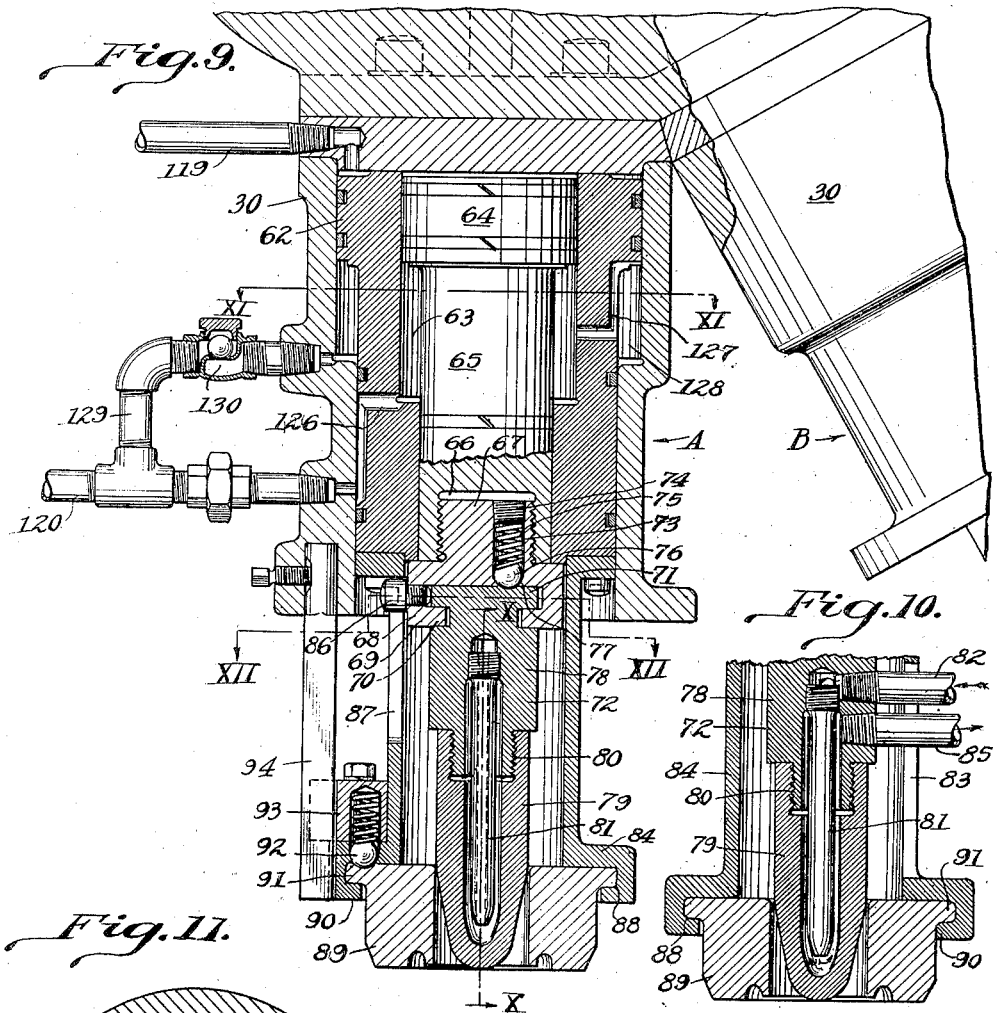

Patented May 10, 1938

2,116,921

UNITED STATES PATENT OFFICE 2,116,921

GLASS PRESS

Henry W. Arnold and Charles Badger, Mount Vernon, Ohio, assignors to The Lamb Glass Company, Mount Vernon, Ohio, a corporation of Ohio Application August 26, 1935, Serial No. 37,801

21 Claims. (Cl. 49—38)

This invention relates to apparatus for fabricating hollow glass articles from charges of molten glass, and has particular reference to a press for the manufacture of bottles adapted for the reception of milk or other liquids.

In the ordinary pressing machine, charges of molten glass are delivered to blanking molds supported in spaced circular order on an intermittently rotatable table. As the table revolves, the molds are successively presented to a pressing station so that while the table is stationary, a pressing head operates to project a plunger into the cavity of a mold occupying the pressing station to impart an initial shape to the charge of molten glass contained within the mold, forming what is known as parisons. At another station, in the orbit of movement of the table, the initially shaped charge of glass, while still in a formative condition, is removed from the blanking mold and inserted in one of a series of finishing molds supported on a second rotatable table. In the finishing mold, pressure is applied to the glass to cause it to assume its final or desired shape, following which, it is removed from the finishing molds and subjected to heat treatment in a leer. Thereafter the bottles are cooled and are in condition for storage or shipment.

Milk bottles, particularly, require different neck finishes both as to shape and size and with the ordinary pressing machine, using a plurality of blanking molds, and a single pressing head or plunger, it is necessary to make a large number of bottles having but a single finish. Usually a milk bottle manufacturing establishment receives orders for bottles of different types and, with the customary apparatus, it is the practice to first complete orders for one type and to then change the apparatus to render it adaptable for the next run wherein another type of finish is produced. This often results in delay in supplying bottles of the different types and in the filling of the orders therefor, since the changing of the apparatus from one type of finish to another involves considerable delay and seriously interferes with the factory production.

It is, therefore, one of the primary objects of the present invention to provide a pressing machine involving an intermittently rotatable table upon which the blanking molds are arranged in spaced circular order, in combination with oscillatable and multiple pressing heads, the rotation of the table, together with cam mechanism carried thereby, serving to effect the automatic operation of valves governing the inflow and outflow of compressed air to and from the multiple pressing heads, whereby to automatically present the latter in desired selected order to the blanking molds when the latter reach the pressing station so that through the operation of the apparatus, the molten glass contained within said molds and pressed or formed by said heads and the plungers thereof may be accorded different shapes or finishes, to the end of obtaining the desired diversity in the form of the pressed glass without interfering with the sustained operation of the machine.

Other objects and advantages of the invention will be apparent from the following detailed description, when considered in connection with the accompanying drawings, in which:

Fig. 2 is a horizontal sectional view on the plane disclosed by the line II—II of Fig. 1 and illustrating more particularly in top plan the table governed valve mechanism for controlling the oscillation and working positions of the pressing heads or cylinders;

Fig. 3 is a horizontal sectional view taken through the table operated valve mechanism;

Fig. 4 is a detail vertical sectional view on the plane indicated by the line IV—IV of Fig. 1 and showing more particularly the compound pivotal supports for the working heads or cylinders;

Fig. 5 is a horizontal sectional view on the line V—V of Fig. 1;

Fig. 6 is a detail vertical sectional view on the line VI—VI of Fig. 5 and disclosing one of the yoke swinging cylinders;

Fig. 7 is a vertical sectional view on the plane indicated by the line VII—VII of Fig. 5;

Fig. 8 is a horizontal sectional view on the line VIII—VIII of Fig. 7;

Fig. 9 is a vertical sectional view taken through one of the pressing heads or cylinders;

Fig. 10 is a detail sectional view on the line X—X of Fig. 9;

Fig. 11 is a horizontal sectional view on the line XI—XI of Fig. 9;

Fig. 12 is a similar view on the line XII—XII of Fig. 9;

Fig. 13 is a diagrammatic view illustrating the cam operated valve mechanism for controlling the operation of the pressing heads or cylinders;

Fig. 14 is a detail sectional view taken through one of the cam actuated valves;

Fig. 15 is a sectional view on the line XV—XV of Fig. 4.

Figure 1:
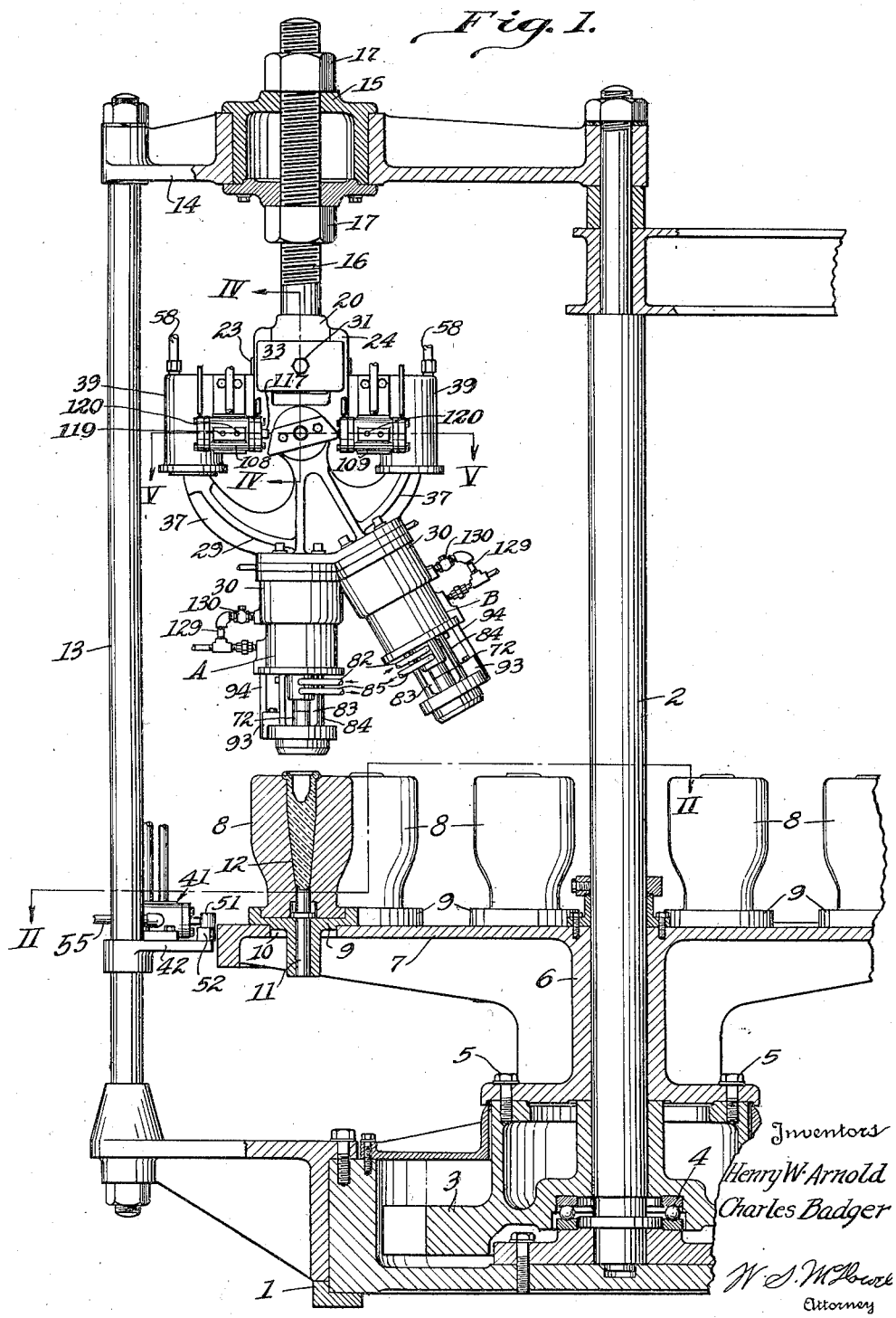
Fig. 1 is a vertical sectional view taken through the center of a glass ware pressing machine and disclosing in front elevation the oscillatable forming heads comprising the present invention.

Referring more particularly to the drawings, the numeral 1 designates the bed frame of a glassware pressing machine in which the apparatus comprising the present invention is embodied. Arising from the bed frame 1 is a stationary shaft 2 and rotatable about the lower end of the shaft 2 is a Geneva drive gear 3, the latter being rotatably supported by a ball bearing 4. The upper end of the hub of the gear 3 is bolted or otherwise secured as at 5 to the lower end of the hub 6 of a mold table 7, which is also rotatable about the shaft 2. It will be understood that the Geneva gear 3 will impart an intermittent, step by step rotary movement to the table 7 in the usual manner common to apparatus of this type.

Supported in spaced circular order upon the table 7 are the blanking molds 8, also of customary design, and which have their lower ends removably seated in holders 9 carried in connection with sockets 10 formed in the table. The holders are provided with the usual positioning and ejecting studs 11, the upper ends of which enter the lower ends of the axial openings 12 provided in the molds 8. As the table intermittently revolves, the molds are presented to the molten glass outlet, not shown, of the glass furnace, and a gather of molten glass is dropped into the openings 12 of said mold to receive a primary pressing and parison-forming operation.

As the table revolves from the gather receiving station, the molds are successively presented to a pressing station where the molten glass gather is acted upon by a plunger to impart to the glass a primary formation. To accomplish this result in a new and improved manner, the present invention provides a plurality of oscillatory pressing heads, indicated generally at A and B in Fig. 1 of the drawings. These pressing heads differ somewhat structurally in order that the molten glass on which they operate will be given different configurations, finishes or formations, and the present invention provides means for automatically moving the heads A and B into and out of registration with a mold occupying the pressing station. The usual pressing machine carries but a single head which, of course, imparts but a single finish to the molten glass operated upon by the same. If different finishes are desired, it is necessary to stop the operation of the machine and substitute different pressing head parts of required configuration. With the present invention, the substitution is no longer necessary as the two pressing heads are instantly and automatically available for producing a plurality of finishes in connection with the glass carried by the molds on the table 7.

This is effected, in the specific form of the invention illustrated, by a frame comprising an upright rod 13 which has its lower end connected with the bed frame 1, and its upper end connected with the outer end of a horizontally disposed cross bar 14, the inner end of said cross bar being stationarily united with the upper end of the shaft 2. The cross bar 14 is formed with a bearing 15 for the reception of a screw shaft 16, the bar being provided with nuts 17 which engage with the upper and lower surfaces of the bearing 15, for the purpose of maintaining the vertical adjustments of the shaft 16.

The lower end of the shaft 16 is provided with a reduced threaded extension 18 which, as shown in Fig. 4, is received within a correspondingly threaded socket 19 provided in a block 20. The block 20 is formed with bores 21 and 22 extending at right angles to each other, the bore 21 being formed to receive a shaft 23 from the ends of which is pivotally suspended a clevis or stirrup 24. In the lower portion of the stirrup 24, there is provided a bore 25 disposed at right angles to the bore 21, and formed to receive bearings 26 in which is rotatably mounted and supported a shaft 27. Fixed to the outer ends of the shaft 27 are the bifurcated arms 28 of a swinging anchor member 29, and to the lower peripheral portion of which is bolted, or otherwise secured, the upper ends of the radially disposed cylinders 30 of the pressing heads A and B. The shaft 23 is provided centrally with a transversely disposed opening through which projects a bolt 31 having a threaded outer end 32, which supports spring pressed clamp blocks 33 and a nut 34. The clamp blocks 33 are positioned on either side of the block 20 and disposed between one of the clamp blocks and the nut 34 on the bolt 31 is a shouldered collar 35 and a coiled expansion spring 36. The force of the spring 36 is normally such as to confine the heads A and B to swinging movement about the axis provided by the shaft 27. If, however, the heads, following a pressing operation, should for any reason not be properly released and elevated from contact with the molds 8, or if rotary motion should be imparted to the table 7 before the completion of a pressing operation, the spring 36 provides for limited swinging movement of the anchor member 29 and the cylinders 30 about the axis of the shaft 23, so that a relief will be present preventing damage or breakage of the pressing heads and the component parts thereof.

The anchor member 29 includes arcuate outer arms 37, the upper ends of which, as shown in Fig. 6, are maintained in constant engagement with the under sides of a pair of pistons 38, which are mounted for reciprocation in open ended cylinders 39, bolted or otherwise secured as at 40 to the stirrup 24. By the reciprocation of the pistons 38, the anchor member 29 is oscillated about the axis of the shaft 27 and the bearings 26 in order to bring the pressing heads A and B into and out of registration with the molds 8. Compressed air is preferably employed as the motivating fluid for effecting the actuation of the pistons 38, and the delivery of such compressed air to one or the other of the cylinders 39 is automatically effected through a control valve mechanism 41.

The mechanism 41 is mounted upon a stationary bracket 42 carried in connection with the upright rod 13 in the horizontal plane of and contiguous to the outer peripheral portion of the table 7. As shown in Figs. 2 and 3, the valve mechanism 41 comprises a casing consisting of a barrel 43 and end members 44. Mounted for reciprocation within the barrel 43 is a sleeve valve 46, one end of which being maintained in contact with one end of a coil spring 47, the latter being supported within a tube 48 projecting from one of the end members 44, the outer end of the tube 48 being provided with a restricted port 49. The opposite end of the sleeve valve includes a stem 50 which slidably projects through the other end member 44 and is disposed in contact with a roller 51 carried by the outer end of a link 52, which is pivotally supported as at 53 in connection with the bracket 42. The roller 51 contacts with the outer peripheral edge of the table 7 and with one or more cam plates 54 carried by and projecting from the outer circumferential portion of the table 7, so that as the table rotates, the engagement of the cam plate or plates 54 with the roller 51 will result in the oscillation of the link 52 and sliding movement of the sleeve valve 46, against the resistance exercised thereon by the spring 47.

With the valve mechanism 41 positioned as disclosed in Fig. 3, compressed air, obtained from any suitable source of supply and under any desired pressure, enters the casing 43 by way of the pipe line 55. The air then travels through the annular groove 56 formed in the outer portion of the sleeve 46 and leaves the valve mechanism 41 by way of a pipe line 57 which includes a flexible connection and leads to one of the cylinders 39, entering the upper end of the latter through one of the connections 58, shown in Fig. 6. The force of the compressed air entering one or the other of the cylinders 39 operates on the upper side of the piston 38 therein, forcing that piston downwardly and oscillating the anchor member 29 and the pressing heads carried thereby. When the sleeve valve is moved from the position disclosed in Fig. 3 to its second position, by the engagement of one of the cam plates 54 with the roller 51, the compressed air entering the valve casing by way of the pipe line 55 passes around a second annular groove 59 formed in the sleeve 46 and passes by way of a flexible pipe connection 60 to the other of the cylinders 39 serving to force the piston in that cylinder downwardly and to oscillate the anchor member and its associated pressing heads in the opposite direction. Compressed air is bled from the cylinder 39 not actively receiving compressed air by way of outlet ports 61 formed in the barrel 43 on opposite sides of the pipe line 55.

Each of the heads A and B comprises a cylinder 30 having the upper end thereof bolted or otherwise rigidly secured to the anchor member 29. Slidably mounted within each of the cylinders 30 is a ring actuating piston 62, and each of the pistons 62 is formed at its upper end to include an axially disposed cylinder bore 63, in which is slidably mounted a plunger actuating piston 64. The piston 64 of each head includes a depending rod 65 having its lower end terminated in an internally threaded axial socket 66, which is adapted for the reception of a threaded extension 67 of a plunger supporting head 68. As shown in Figs. 9 and 12, the head includes a depending annular flange 69 which terminates in inwardly and laterally directed, arcuately spaced lugs 70 which are adapted to receive and support similarly shaped and disposed lugs 71 provided on the upper end of a plunger 72. In connecting the plunger 72 with the head 68, the lugs 71 are positioned so that they pass between the lugs 70, then by partially rotating the plunger about its longitudinal axis, the lugs 70 and 71 are brought into retaining engagement as shown in Fig. 9. When thus positioned, accidental rotary movement of the plunger about its longitudinal axis is prevented by providing the head 68 with a vertical bore 73, which is closed at one end by a plug 74 and receives a coil spring 75, the latter engaging with a ball 76 held by a seat 77 so that the lower end of the ball will project somewhat below the bottom of the head 68 and will be received within a spherical depression provided in the upper end of the plunger 72.

Each of the plungers 72 includes an upper member 78 and a substantially hollow lower member 79, the two members being united by the threaded connection 80. In producing certain types of bottles, particularly large milk bottles, it is necessary to cool the plungers, preferably by circulating water through the interior thereof. This may be accomplished by providing the upper member 78 with a depending tube 81. The upper end of this tube 81 communicates with a flexible water supply connection 82, which projects, as shown in Fig. 10, through a vertical slot 83 provided in a ring retaining sleeve 84 which is carried by and depends from the lower end of each of the ring pistons 62. Water enters the connection 82, passes downwardly through the bore of the tube 81 and comes into direct contact with the lower or hottest portion of the plunger. The cooling water is then forced upwardly around the outer sides of the tubes 81 and through the hollow interior of the plunger and finds escape through the water outlet connection 85. A set screw 86 may also be utilized for retaining the upper end of each of the plungers 72 in connection with the head 68 of the piston rod 65 and the head of the screw 86 is, as shown in Fig. 9, slidably received within a slot 87 formed in the ring sleeve 84.

The lower end of the sleeve 84 terminates in an annular seat 88 formed for the reception of a neck or finish-forming ring 89. The seat 88 includes inwardly turned arcuately spaced lugs 90 which receive correspondingly formed lugs 91 formed in connection with the ring 89. The ring 89 may be detachably connected with the lower end of the sleeve 84 by moving the ring upwardly so that the lugs 91 thereof pass between the spaces formed between the lugs 90. Then by partially rotating the ring member 89, the lugs 91 will be positioned over the lugs 90 and supported thereby. This position is maintained by the spring pressed ball 92 carried by the lower end of the sleeve 84. The sleeve 84 includes at its lower end a fixed bracket 93 formed with a recess for the reception of a guide rod 94, which rigidly depends from the bottom portion of each of the cylinders 30.

In the operation of each of the pressing heads, with the latter in pressing positions, compressed air is admitted into the upper end of the cylinder 30 in operation which causes downward movement of both of the pistons 62 and 64. This brings the neck or finish-forming ring 89 into contact with the upper surface of the mold 8 occupying the pressing station, thereby arresting further downward movement on the part of the piston 62 but maintaining the ring in firm contact with the mold. Under the action of the compressed air, the plunger piston 64 continues its descent after the termination of downward movement of the ring piston. This causes the plunger 72 to enter the bore or cavity of the mold and to impart the desired initial formation to the body of molten or formative glass contained therein. Upon the completion of the downward stroke of the plunger, through automatic valve mechanism to be hereinafter described, the plunger piston 64 is first moved upwardly to withdraw or strip the plunger from the mold and contact with the glass, this being accomplished while the forming ring is still maintained in firm contact with the top of the mold. After the plunger has been raised to a sufficient degree so as to be out of contact with the mold, the ring piston 62 then moves upwardly to assume its elevated or normal position in unison with the plunger piston.

To advance and retract the ring and plunger pistons in the order set forth, there is employed a cam shaft 95, as disclosed in Fig. 13. This shaft is driven in any suitable manner by the mechanism employed for imparting rotation to the table 7, but at a higher rate of speed, the rate of speed being governed by the number of blanking molds carried by the table. For instance, in the event the table carries ten molds, the cam shaft 95 will revolve at ten times the rate of speed of the mold table. In this manner, the shaft 95 makes a complete revolution for each increment of travel of the mold table. Carried by the shaft 95 are cams 96 and 97, the peripheral portions of which are disposed in contact with the protruding operating stems 98 of the valves 99 and 100, the latter being of duplicate construction. As shown in Fig. 14, each of the valves 99 comprises a casing in which is formed an internal seat 101 for the reception of a valve head 102. Compressed air from a suitable source of supply, as, for instance, the pipe line 103, enters the valves 99 and 100 by way of the inlet pipes 104, the compressed air so entering serving to maintain the heads 102 in contact with their respective seats 101. If desired, coil springs 105 may be disposed between the heads 102 and the inlet pipes 104 to assist in maintaining the heads seated. As the cams 96 and 97 revolve, however, in timed order, they engage the outer ends of the stems 98, causing the unseating of said valves and the resulting flow of compressed air through the outlet pipes 106 and 107 which lead to governor valves 108 and 109 carried by the stirrup 24.

These valves have been illustrated in detail in Figs. 7 and 8, wherein it will be observed that each of the same comprises a casing 110 having a bore 111 for the reception of a sleeve valve 112. Compressed air from the line 103 enters the central portion of each of the casings 110 by way of the supply pipes 113. Each of the sleeve valves 112 is formed with annular grooves 114 and 115 separated by a head portion 116, which is adapted to be moved from one side to the other of the air supply pipes 113. Each sleeve valve 112 includes a stem 117 which projects through one end of its casing 110 for engagement with a cam bar 118 which is rotatable with the shaft 27 and the anchor member 29. With the bar 118 in contact with the stem 117, as shown in Figs. 1 and 7, reciprocation of the pistons in the inactive working head (i. e. the head B) is prevented. However, due to the shape of the cam bar, free and independent movement of the valve 112 governing the operation of the active head (the head A) is freely permitted.

Leading from the sides of the governor valves are spaced flexible pipe lines 119, which extend to the tops of the cylinders 30 above the upper ends of the pistons 62 and 64. Corresponding pipe lines 120 extend from the governor valves to the lower portions of the cylinders 30 and are used to supply the heads with air pressure for the purpose of raising the pistons 62 and 64, whereas the pipe lines 119, when open, cause the lowering of said pistons. Connected with the ends of the casings 110 are inlets 121 and 122 which are connected respectively with the pipe lines 106 and 107 leading from the valves 99 and 100.

In the operation of the apparatus, the intermittent rotation of the table 7 provides for the depositing of gathers of molten glass in the openings or cavities of the molds 8 and the successive presentation of these gather-filled molds to the pressing position or station. Unless the cam plate 54 on the peripheral portion of the table is in engagement with the roller on the link 52, the head A occupies a position disposed in vertical registration with the mold in the pressing station. This is assured by the fact that compressed air entering the valve 41 by way of the pipe line 55 passes through the groove 56 of the sleeve 46 and thence by way of the flexible connection 58 to one of the cylinders 39, and acts on the piston 38 therein in order to rock the anchor member 29 or maintain the same in a position wherein the head A occupies axial registration with the mold beneath the same. Air is released from the opposite of the cylinders 39 by way of the connection 58 formed therewith which leads to the valve 41 and then by reason of the position of the sleeve valve 46, vent to the atmosphere through one of the outlet ports 61 is provided. In this manner, compressed air is delivered to one or the other of the cylinders 39 to positively hold the same in its operating position in vertical registration with a mold occupying the pressing station and supported by the table 7, the opposite cylinder being depleted of air to provide for this registration. In the event the head B is to be employed in one or more pressing operations in a single complete revolution of the mold table, the extended cam plates 54 are positioned so that they will immediately come into contact with the roller 51 and the link 52 subsequent to the resumption of rotation of the mold table following the operation employing the pressing head A.

The length of the cam plate 54 assures complete operation and shifting of the anchor member 29 so that the head B will have plenty of time to reach the pressing position before the rotation of the mold table is again arrested. The ends of the cam plate are secured by removable bolts or screws 123, which provide for the ready removal of the cam plates or the positioning of the same on the mold table at will and at such positions as may be desired. Thus alternate molds may be operated upon by the head B, or other proportions may be employed. For instance, the head B may only operate upon but one of a group of ten molds assembled upon the table. The operation of the head B, however, will be automatic and without the necessity of manual control. Following the positioning of the heads A and B, as above set forth, in registration with the underlying molds, it then becomes necessary to depress and elevate the plunger 72 and the forming ring 89. This is automatically effected by the operation of the cam shaft 95, bearing the cams 96 and 97, the cam 96 being provided at its periphery with a laterally projecting tooth 124 and the cam 97 with a peripheral recess 125. The rotation of these cams at a fixed rate in relation to the intermittent rotation of the mold table actuates the valves 99 and 100, providing for the regulated flow of compressed air into one end or the other of the governor valves 108 and 109 so that the sleeve valves 112 therein may be reciprocated. However, it may be noted at this point that the valve 108 or 109 connected with the inactive head is held in a stationary position by the cam bar 118, so that the flow of compressed air through that governor valve will merely serve to maintain the pistons 62 and 64 in the inactive head in their elevated positions. The valve 108 or 109 which is connected with the head occupying an active or operative position is so disposed that its sleeve 112 may freely reciprocate without interference from the cam bar.

For instance, assuming, as shown in Fig. 13, that the governor valve 108 is employed to reciprocate the pistons in the head A, the cam 96 first trips the valve 99 so that the sleeve valve 112 in the valve assembly 108 is reciprocated to provide for the flow of compressed air to the top of the cylinder 30, thereby causing concurrent downward movement of the pistons 62 and 64. This action is continued until the forming ring 89 connected with the piston 62 contacts with the top of the mold at which time further downward movement of the piston 62 is stopped but the piston 64 continues its downward movement carrying with it the plunger 72 and bringing the latter to its lowered position in the mold.

The cam 97 then operates to reverse the direction of air supply to the valve 108 so that the delivery of compressed air to the top of the cylinder 30 is discontinued and the air contained within said cylinder vented to the atmosphere. The reverse movement of the valve 112 in the valve 108 then causes compressed air to be delivered to the active cylinder 30 in order to effect the elevation of the pistons 62 and 64 by way of the pipe lines 120. By reference to Fig. 9, it will be noted that compressed air admitted into the cylinder to effect the elevation of the pistons 62 and 64 first passes upwardly through an angular port 126 formed in the outer wall of the piston 62, so that this initial delivery of compressed air in the raising of the pistons is delivered to the plunger piston 64, causing its elevation and the removal of the plunger 72 from the mold with which it has been cooperating. The upward movement of the plunger 64 uncovers a second angular port 127 formed in the piston 62 and communicating with an annular space 128 surrounding the piston 62. The uncovering of the port 127 by the upward movement of the piston 64 permits of the passage of compressed air into the space 128 and therefore the upward movement of both pistons in unison. A by-pass line 129 is provided in connection with each of the cylinders 30 and is equipped with a ball check valve 130 so that when the port 127 is uncovered by the upward movement of the piston 64, equalized pressures may be applied to both pistons.

The construction and operation of the apparatus, it is believed, will be clearly understood from the foregoing description. It will be apparent that in simplicity of construction and ease of operation, the present invention possesses numerous advantages over the machines of the prior art. While we have illustrated and described the preferred embodiment of the present invention which functions reliably and efficiently, it is obvious that many changes and modifications could be made by those skilled in this art and may be substituted for this present mechanism without change in mode of operation or loss of advantage; hence it is to be understood that the present invention covers all such changes and modifications as fall within the scope of the appended claims.

What is claimed is:

1. In a glass press, a frame, an intermittently rotatable mold supporting table, a plurality of molds carried by said table, a movable pressing head supported by said frame above said table, said head including a plurality of cylinders each provided with a relatively movable plunger and pressing ring differing in configuration from the plunger and pressing ring of an adjacent cylinder, pneumatically controlled means actuated by the rotation of said table for selectively aligning any of said cylinders in vertical pressing registration with one of said molds, and pneumatically controlled means operative to automatically move only the plunger and ring of the cylinder aligned with a mold into and out of engagement with the glass in the mold.

2. In a glass press, a frame, an intermittently rotatable mold supporting table, a plurality of molds carried by said table, an oscillatory pressing head supported by said frame above said table, said head including a plurality of radially arranged cylinders, each provided with a relatively movable plunger and pressing ring, pneumatic means actuated by the rotation of said table to oscillate said head to bring any cylinder of said head selectively into vertical pressing registration with a mold on said table occupying a pressing position, and pneumatically actuated means for raising and lowering the plunger and pressing ring of the cylinder in vertical registration with the mold disposed in the pressing position.

3. In apparatus for pressing glass, a pressing head including a pair of spaced cylinders, pistons movable in said cylinders, a rockable supporting member having arcuate arms engaged with the pistons in said cylinders, a plurality of radially disposed pressing cylinders projecting outwardly from said supporting member, and means for introducing a fluid under pressure into said first-named cylinders to effect the oscillation of said supporting member and the pressing cylinders carried thereby.

4. In a glass press, a supporting frame, a pressing head including an oscillatory supporting member, radially extending cylinders rigidly carried by and projecting from said supporting member, fluid actuated means carried by said head for oscillating said supporting member and the cylinders carried thereby, and means for adjusting said head bodily relative to said frame.

5. In a glass press, a frame including a cross bar, a supporting stem adjustable vertically with respect to said bar, a pressing head pivotally connected with the lower end of said stem, an oscillatory member carried by said head, cylinders projecting radially from the outer portions of said oscillatory member, and means carried by said head for effecting the oscillation of said member and the cylinders carried thereby.

6. Pressing head glass presses comprising a pair of position-controlling cylinders, a sector member oscillatable about a horizontal axis and formed with a plurality of arcuate arms disposed to enter said cylinders through the lower portions thereof, fluid actuated pistons mounted within said cylinders and engageable with said arms, means for introducing fluid under pressure into said cylinders to control the operating positions of said sector member, and a plurality of radially extending pressing cylinders carried by and projecting downwardly from said sector member.

7. In a glass press, a plurality of radially disposed, pivotally supported pressing cylinders, a pair of pistons arranged in each of said cylinders, a plunger connected with one of said pistons and a pressing ring connected with the other thereof, pneumatic means for oscillating said cylinders to bring a selected cylinder into an operative pressing position, pneumatically controlled means for actuating the pistons in the cylinder occupying the pressing position, and means controlled by the operating positions of said cylinders for retaining the pistons in the cylinder occupying an inactive position restrained against operation.

8. In a glass press, a frame, a pressing head adjustably carried by said frame, a pair of radially extending oscillatory cylinders carried by said head, a pair of pistons arranged in each of said cylinders, a plunger connected with one of said pistons and a forming ring connected with the other thereof, pneumatic means for oscillating said cylinders to bring the latter selectively into pressing positions, and pneumatic means for actuating the pistons in the cylinder occupying the pressing position, said last-named means including a pair of valves carried by said pressing head and actuated by the positions of said cylinders to restrain the pistons in the cylinder occupying an inactive position against operation.

9. In a machine for pressing glass, a frame, an intermittently rotatable mold supporting table, a plurality of molds carried by said table, an oscillatory pressing head adjustably supported by said frame above said table, said head being formed with a pair of cylinders, a pivoted supporting member carried by said head, radially extending cylinders carried by said supporting member, pistons in said first mentioned cylinders cooperative with said supporting member to vary the operating positions of said second-mentioned cylinders, means for supplying said first-mentioned cylinders with a fluid under pressure including a valve for governing the flow of said fluid to one or the other of said cylinders, and cam devices carried by said table and cooperative with said valve to automatically regulate the operation thereof.

10. In a glass pressing machine, an intermittently revolving table, a plurality of molds carried thereby, an oscillatory pressing head mounted above said table, said head including a plurality of radially arranged fluid receiving cylinders, each provided with a relatively movable plunger and pressing ring, a valve for each of said cylinders for controlling fluid flow thereto, and automatic means for rendering one of said valves inactive and oscillating said head to selectively align any one of said cylinders in pressing registration with one of said molds at a common pressing station.

11. In a glass pressing machine, a frame, an intermittently rotatable mold supporting table, a plurality of molds carried thereby, an oscillatory pressing head supported by said frame above said table, said head including a plurality of radially extending fluid receiving cylinders each provided with a relatively movable plunger and pressing ring, valve means for each cylinder for controlling fluid flow thereto, and means controlled by the operation of said table for resisting actuation of a portion of said valve means and selectively aligning any one of said cylinders in vertical pressing registration with one of said molds.

12. In a machine for pressing glass, a frame, an intermittently rotatable mold supporting table carried by said frame for step by step rotation about a vertical axis, a plurality of molds carried in spaced circular order by said table, said molds being adapted for the reception of gathers of molten glass, an oscillatory pressing head supported by said frame above said table, said head including a plurality of radially disposed air receiving cylinders each provided with a relatively movable plunger and pressing ring, a valve for each cylinder for controlling the flow of air thereto, and pneumatic means controlled by the operation of said table for selectively aligning any one of said cylinders with the plungers and rings thereof in vertical pressing registration with one of said molds and rendering inactive one of said valves.

13. In a glass press, a frame including a cross member, a stem carried by and adjustable vertically with respect to said cross member, a pressing head pivotally suspended from the lower end of said stem, a plurality of oscillatory radially extending fluid receiving cylinders carried by said head, and valve means for governing fluid flow to said cylinders, said valve means being controlled by the position of said head.

14. In a glass press, a pressing head including a cylinder, a piston movable in said cylinder and formed with a central bore having open communication with the interior of said cylinder above said piston, a second piston movable in said bore independently of said first-named piston, a plunger carried by said second-named piston, and a mold engaging ring movable in unison with said first-named piston.

15. A pressing head for glassware forming machines comprising a cylinder, a primary piston mounted for reciprocation within said cylinder, said piston being formed with an axially disposed bore having substantially unrestricted communication with the interior of said cylinder above said piston, a secondary piston slidably engaged with the walls of said bore, a molding ring movable in unison with said primary piston, a plunger movable in unison with the secondary piston, means for introducing a fluid under pressure into one end of said cylinder to effect simultaneous downward movement of both of said pistons, means for terminating the descent of the primary piston prior to that of the secondary piston, and valve means for introducing a fluid under pressure into the lower end of said cylinder to effect the elevation of said pistons subsequent to their descent.

16. In a glass pressing machine having a frame, a rotatable mold-supporting table and a plurality of molds carried by said table, a pressing head adjustably supported above said table, said pressing head including a pair of stationary cylinders, a bracket member pivoted for rocking movement between said stationary cylinders, a plurality of pressing cylinders carried by said bracket member, a relatively movable plunger and pressing ring carried by each of said pressing cylinders and automatic means controlled by the rotation of said table for introducing fluid under pressure to said stationary cylinders to rock said pivoted bracket member.

17. In a glass pressing machine having a frame, a rotatable mold-supporting table and a plurality of molds carried by said table, a pivoted bracket member adjustably supported above said table, a plurality of pressing cylinders provided upon said bracket member for movement therewith, glass forming tools carried by each of said pressing cylinders, a stationary cylinder carried by said frame, a piston movable in said cylinder, automatic means controlled by the rotation of the table for introducing fluid under pressure to said stationary cylinder, and a motion transmitting connection between said pivoted bracket member and the piston in said stationary cylinder.

18. In a glass press, a pressing head including a cylinder provided with a bore having an annular shoulder formed therein, a headed piston slidably received in said bore with the head thereof positioned above said shoulder, said piston also being provided with a bore having an internal shoulder formed therein, a second headed piston slidably received in the bore in said first piston with the head of said second piston positioned above the shoulder of the bore in said first piston, a plunger carried by said second piston, and a mold engaging ring movable in unison with said first piston, the side wall of said first piston being provided with an aperture which extends through the wall from a point below the head of said first piston to a point above the shoulder in the bore in said piston.

19. In a glass press, a pressing head including a cylinder provided with a bore having an annular shoulder formed therein, a headed piston slidably received in said bore with the head of said piston positioned above said shoulder, said piston also having a bore with a second annular shoulder formed therein, a second headed piston slidably received in the bore in said first piston with the head on said second piston positioned above said second shoulder, a plunger carried by said second piston, a mold engaging ring movable in unison with said first piston, and means for introducing fluid under pressure to the space between the head on said second piston and the second shoulder, the wall of said first piston being formed with a passageway extending therethrough from a point adjacent the head to a point above the shoulder in the bore in said piston.

20. In a glass press, a pressing head including a cylinder provided with a bore having an annular stop shoulder formed therein, a headed piston slidably received in said bore with the head of said piston positioned above said shoulder, said piston having a central bore with a second stop shoulder formed therein, a second headed piston slidably received in the bore in said first piston with the head of said second piston positioned above said second stop shoulder, the side wall of said first piston being provided between the shoulder of said bore and the inner end of said piston with a passageway connecting the bore in said cylinder with the bore in said piston, glass forming tools carried by said pistons, and valve controlled means for introducing fluid under pressure, first to the bore in said cylinder above said pistons and then to the bore in said first piston at a point adjacent the stop shoulder formed in said bore.

21. In a machine for pressing glass, a frame, a table supported by said frame for intermittent rotation about a vertical axis, a plurality of molds supported by said table, a movable pressing head carried by said frame above said table, said head including a plurality of cylinders each provided with a relatively movable plunger and pressing ring, and pneumatic means actuated by said table for determining which of the plungers and pressing rings carried by the cylinders will be operated and aligning the cylinder to be operated in vertical pressing registration with one of said molds.

HENRY W. ARNOLD.
CHARLES BADGER.